United States Patent Office 2,976,774
Patented Mar. 28, 1961

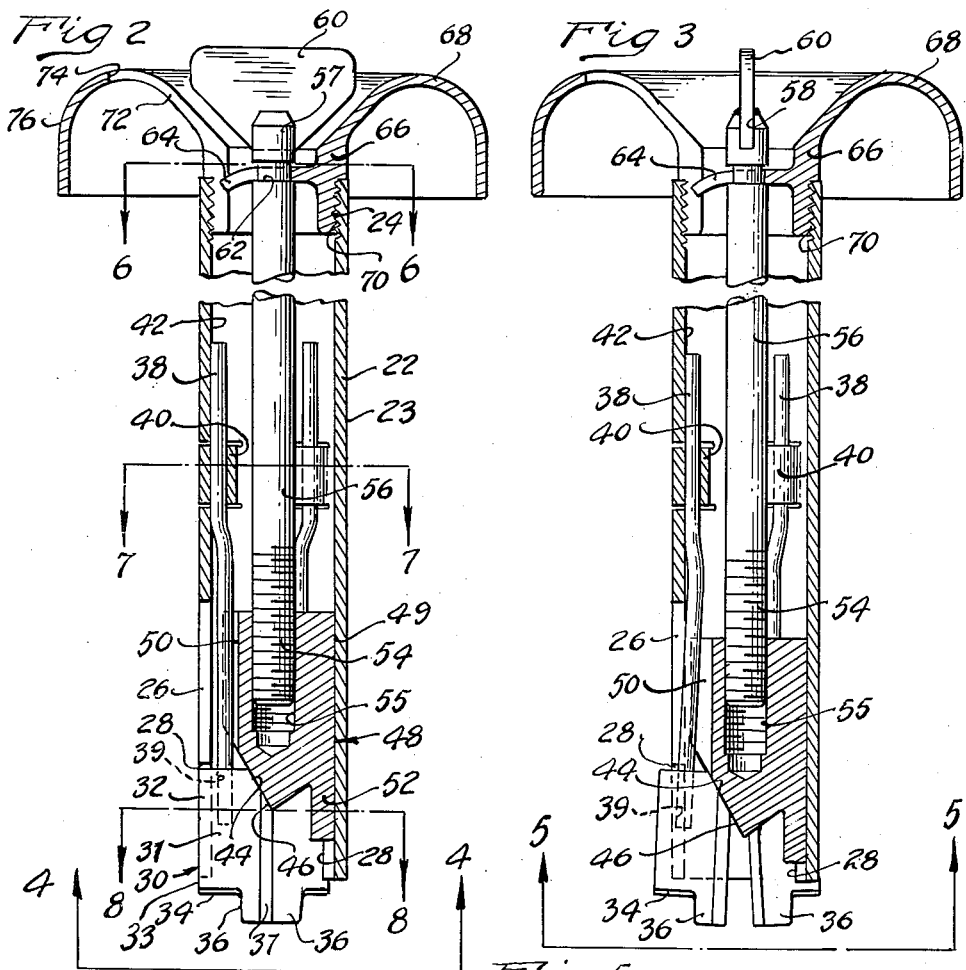

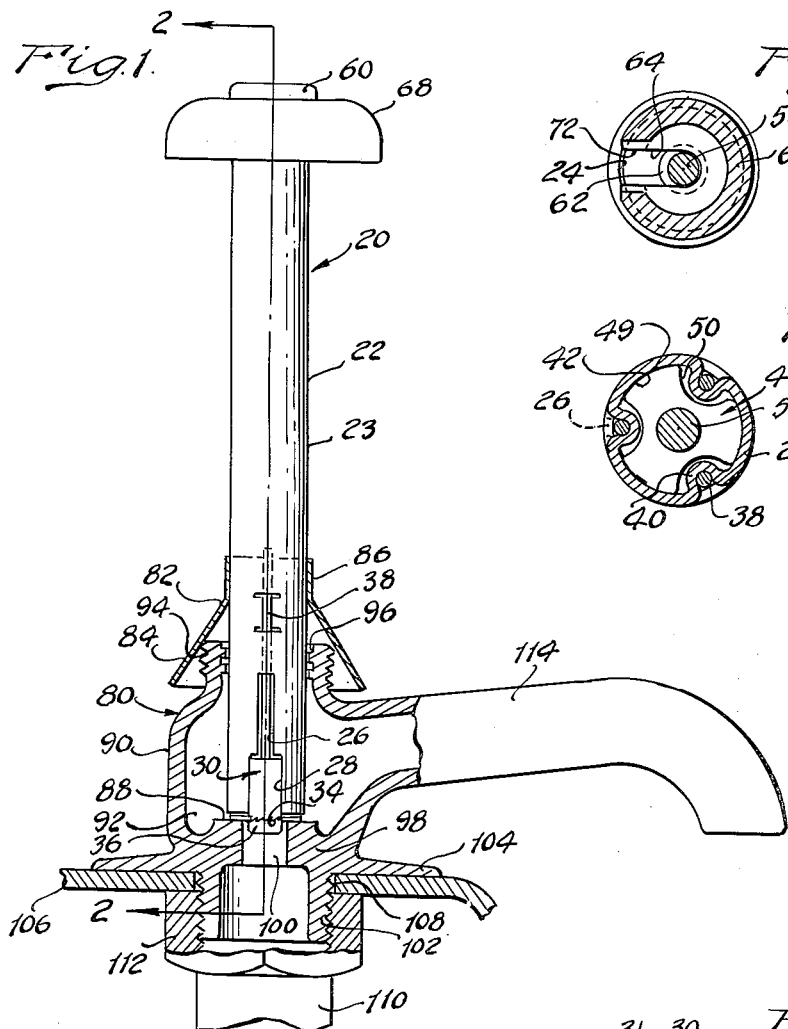

2,976,774
VALVE RESEATING TOOL
Robert F. W. Hess, 3525 Cass Ave., Detroit 1, Mich.
Filed June 16, 1958, Ser. No. 742,282
6 Claims. (Cl. 90—12.5)

This invention relates to valve reseating tools and, in particular, to expansible valve reseating tools, such as are used by plumbers, for example, in reseating the valve seats of faucets and the like.

One object of this invention is to provide a valve reseating tool having cutting jaws which are expansible or contractible relatively to one another so as to adapt the tool efficiently to valve seats with different diameters of openings therein.

Another object is to provide a valve reseating tool of the foregoing character wherein the lower end of the tool which is required to enter the interior of the faucet or other valve to be reseated is of exceptional compactness and smallness so that the present tool can be inserted in smaller faucets or other valves than prior tools for the same purpose, yet can be expanded to fit the valve seats of faucets of larger sizes, thereby adapting the tool to the reseating of a wide range of sizes of valve seats for faucets or other valves.

Another object is to provide a valve reseating tool of the foregoing character wherein the cutting jaws are expanded by a wedging device movable toward the jaws in expanding them and located upwardly or rearwardly of the jaws so as to occupy space behind the jaws rather than inside the jaws, thereby reducing the overall diameter of the tools while enabling the use of cutting jaws of adequate radial thickness for sufficient strength for heavy duty valve reseating.

Another object is to provide a valve reseating tool of the foregoing character wherein the jaw expander is provided with a hand wheel or other handle which is quickly and easily detached from the expander shaft in an easy and rapid manner.

Other objects and advantages of the invention will become apparent during the course of the following description of the accompanying drawings, wherein:

Figure 1 is a side elevation of an expansible valve reseating tool, according to one form of the invention, shown partly in section and inserted in a conventional faucet, also shown partly in longitudinal section, in position for reseating the faucet valve seat;

Figure 2 is an enlarged central vertical section through the valve reseating tool of Figure 1, with the guide cone removed and with the cutting jaws in their retracted positions;

Figure 3 is a view similar to Figure 2, but showing the cutting jaws in their laterally-expanded positions;

Figure 4 is a bottom plan view of the valve reseating tool of Figures 1 to 3 inclusive, looking in the direction of the arrows 4—4 in Figure 2;

Figure 5 is a similar bottom plan view looking in the direction 5—5 in Figure 3;

Figures 6, 7 and 8 are cross-sections taken respectively along the lines 6—6, 7—7 and 8—8 in Figure 2;

Figure 9 is a side elevation of the cutting jaw expander head of the valve reseating tool of Figures 1 to 8 inclusive; and Figure 10 is a bottom plan view of the expander head shown in Figure 9.

Referring to the drawings in detail, Figures 1 to 10 inclusive show an expansible valve reseating tool, generally designated 20, according to one form of the invention as mounted and contained mainly within a hollow tubular barrel 22 with a cylindrical outer surface 23 and having an internally-threaded upper end portion 24 and with three circumferentially-spaced parallel axial slots 26 (Figures 1, 2 and 8) in its lower end, these slots 26 having widened rectangular radial openings or notches 28 at their extreme lower ends. Fitted into and radially movable in these approximately parallel-walled notches 28 are three cutting jaws or cutting bits, generally designated 30, each having a base portion 32 (Figures 2, 4, 5 and 8) with parallel sides 31 and a substantially radial forward cutting end 33 with cutting teeth or edges 34 thereon (Figure 4). Below the forward cutting end 33 of each jaw 30 is a forwardly-protruding slightly tapered pilot portion or nose portion 36 extending approximately one-third of a circumference so as to be approximately sector-shaped in cross-section (Figure 5), and with the other two pilot portions 36 forming a frusto-conical shape of circular cross-section. The beveled inner flat sides 37 of the cutting jaws 30 extend rearwardly the major part of the entire length of the base portion 32. Each cutting jaw or bit 30 has an outer surface 35 which is approximately a portion of a cylinder coextensive with the outer surface 23 of the tubular barrel 22 when the jaws 30 are in their retracted positions (Figure 2).

Each cutting jaw or bit 30 is drilled at its rearward end as at 39 to receive the forward end of a spring wire 38 mounted therein (Figures 2 and 8) and secured in any suitable way as by brazing or press-fitting. The rearward portions of the spring wires 38 are mounted in inwardly-struck recessed portions 40 of the barrel 22 (Figures 2 and 7) where they are held in position by the resilience of the wires 38, the wires 38 being normally in slightly arcuate or bowed forms in order to provide a gripping effect against the inner surface 42 of the barrel 22 when they are pushed through the inwardly-struck recessed portions 40. Thus, in assembly, the three cutting jaws or bits 30 present the appearance shown in front elevation in Figure 4. The bases 32 at their rearward inner ends are beveled as at 44 (Figures 2 and 3) to receive the triangularly-pyramidal pointed forward end 46 of a cutting jaw expander, generally designated 48. In other words, the forward end 46 is in the form of a small pyramid of triangular cross-section as well as of triangular longitudinal section (Figure 9). The expander head 48 is in the form of a cylindrical plug with an outer cylindrical surface 49 slidably fitting the barrel 22 and having axial flutes 50 along the rearward portion thereof and circumferentially-spaced pilot portions 52 along the forward end thereof. These pilot portions 52 (Figure 10) are also spaced radially from one another as well as circumferentially, and are of approximately sector-shaped cross-section to fit into the sector-shaped spaces 53 (Figures 8 and 10). The pilot portions 52 also project axially beyond the forward end 46 of the expander head 48 so as to precede the latter in the cutting jaw expanding action thereof.

The expander head 48 is bored and threaded as at 55 in its rearward end portion to receive the correspondingly-threaded forward end 54 of an elongated rod 56, the outer or rearward end 57 of which is longitudinally slotted as at 58 to receive a flat approximately triangular thumb piece or handle 60 brazed or otherwise secured thereto. The end portion 57 has an annular groove 62 disposed slightly below the end of the slot 58 (Figures 2 and 3) and which fits into an approximately radial slot 64 (Figures 2, 3 and 6) in the tubular hub 66 of a sheet metal hand wheel 68, the hub 66 being externally threaded as at 70 (Figures 2 and 3) to threadedly engage the internally-threaded upper end portion 24 of the tubular barrel 22. The hand wheel 68 has an approximately radial slot 72 extending inwardly as far as the slot 64 but terminating at 74 short of the rim 76 of the hand wheel 68 so as to permit easy assembly and disassembly of the hand wheel 68 upon the rod 56, as explained below in connection with the operation of the invention.

In order to guide the tool barrel 22 into the faucet 80, and hold it in a centered position (Figure 1), the tool 20 is provided with a hollow approximately conical guide member 82 having a conical forward portion 84 and a hollow cylindrical rearward hub portion 86, the latter slidably fitting and engaging the outer surface 23 of the barrel 22.

In the operation of the invention, let it be assumed that the faucet 80 (Figure 1) has a valve seat 88 which requires reseating. The faucet 80 is of conventional construction and its details form no part of the present invention. The faucet body 90 is provided with a valve chamber 92 having an externally-threaded upper end portion 94 with an internally-threaded opening 96 therein through which the faucet valve member is ordinarily inserted and threaded but which, for reseating purposes, is removed temporarily by the plumber. The faucet 80 has a bottom wall 98 at the lower end of the valve chamber 92 and carrying the annular valve seat 88 on the upper surface thereof surrounding the bore 100 through which the water passes upward from the externally-threaded pipe connection portion 102 of the faucet 80. The faucet 80 is shown as having the usual mounting flange 104 which serves as an abutment against the counter or sink panel or plate 106 having a hole 108 through which the threaded faucet portion 102 extends downward. Connection is made to a water service pipe 110 by an internally-threaded pipe coupling collar 112 threaded onto the threaded faucet portion 102 in the usual way. The faucet 80 has the usual spout 114 extending laterally from the body 90 and communicating with the valve chamber 92.

To reseat the valve seat 88 within the valve chamber 92, the operator, having first rotated the handle 60 to draw the expander head 48 upward in order that the spring wires 38 shall contract the cutting jaws 30 to their inwardly-drawn positions shown in Figures 2 and 4, lowers the barrel 22 through the opening 96 in the upper end of the faucet body 90 until the pilot portions 36 enter the central opening 100. If the opening 100 is larger than the total diameter of the three pilot portions 36 when thus drawn inward, the operator, while holding the hand wheel 68 in the fingers of one hand, rotates the handle 60 between the thumb and fingers of the other hand so as to cause the expander head 48 to move downwardly in the barrel 22. This action by the wedging engagement of the triangular pyramidal end portion 46 of the expander head 48 with the beveled rearward end portions 44 of the cutting jaws or bits 30, moves the latter approximately radially outward from the positions of Figures 2 and 4 to the positions of Figures 3 and 5 until the pilot portions 36 snugly but rotatably fit the opening 100.

The operator then presses downward upon the hand wheel 68 while simultaneously rotating it, thereby causing the barrel 22 to rotate the cutting jaws 30, whereupon the sharp-edged corrugated or fluted portions 34 remove the uneven metal portions from the valve seat 88 and reseat it with a flat surface. Meanwhile, the guide 82 has been moved downward to engage the outer edge of the upper faucet portion 96, centering the tool 20 as it is rotated during its reseating operation. After reseating, the tool 20 is withdrawn and the faucet valve member reinserted in the faucet 80 in the usual way.

What I claim is:

1. A valve reseating tool comprising an elongated tubular support having a plurality of circumferentially-spaced longitudinally-directed recesses at the forward end thereof, each recess having opposite longitudinal edges with substantially parallel jaw guide surfaces extending longitudinally therealong, a plurality of cutting jaws movably mounted in said recesses in sliding guiding engagement with said longitudinally-extending jaw guide surfaces, said jaws having outer ends with cutting teeth thereon projecting forwardly from said forward end of said support, elongated longitudinally-extending spring jaw carriers secured to their forward ends to said jaws and at their rearward ends to said support, said spring jaw carriers resiliently urging said jaws laterally toward one another, a cutting jaw expander reciprocably mounted within said support with its forward end engaging the rearward ends of said jaws, the forward end of said expander and the rearward ends of said jaws having thereon interengaging surfaces disposed obliquely to the axis of rotation of said expander and cooperably responsive to the forward motion of said expander during reciprocation thereof for moving said jaws laterally away from one another in guided engagement with said longitudinally extending jaw guide surfaces of said recesses, and mechanism for reciprocating said expander within said support.

2. A valve reseating tool comprising an elongated tubular support having a plurality of circumferentially-spaced longitudinally-directed recesses at the forward end thereof, a plurality of cutting jaws mounted in said recesses having outer ends with cutting teeth thereon projecting forwardly from said forward end of said support, jaw carriers movably securing said jaws to said support for motion laterally toward and away from one another, a cutting jaw expander reciprocably mounted within said support with its forward end engaging the rearward ends of said jaws, the forward end of said expander and the rearward ends of said jaws having thereon interengaging contact surfaces disposed obliquely to the axis of rotation of said expander and cooperably responsive to the forward motion of said expander during reciprocation thereof for moving said jaws laterally away from one another, and mechanism for reciprocating said expander within said support, said jaws having forwardly-inclined contact surfaces on their rearward ends and said expander having a forwardly-tapered central portion on its forward end, said central portion of said expander having inclined side surfaces engageable with said inclined contact surfaces on said jaws, said expander having peripherally-disposed circumferentially-spaced forwardly-extending guide portions interposed between said jaws.

3. A valve reseating tool, according to claim 2, wherein said guide portions are of approximately sector-shaped cross-section.

4. A valve reseating tool comprising an elongated tubular support having a plurality of circumferentially-spaced longitudinally-directed recesses at the forward end thereof, a plurality of cutting jaws mounted in said recesses having outer ends with cutting teeth thereon projecting forwardly from said forward end of said support, jaw carriers movably securing said jaws to said support for motion laterally toward and away from one another, a cutting jaw expander reciprocably mounted within said support with its forward end engaging the rearward ends of said jaws, the forward end of said expander and the rearward ends of said jaws having thereon interengaging contact surfaces disposed obliquely to the axis of rotation of said expander and cooperably responsive to the forward motion of said expander during reciprocation thereof for moving said jaws laterally away from one another, and mechanism for reciprocating said expander within said support, said mechanism including an elongated rotary member threadedly engaging said expander, a thrust bearing connected to said support and holding said rotary member against axial displacement, and a hand grip element connected to the rearward end of said support, said hand grip element having an elongated laterally-disposed slot extending inwardly from a location spaced away from the axis of rotation of said rotary member to said thrust bearing.

5. A valve reseating tool, according to claim 4, wherein said thrust bearing has a bearing bore with an opening in the side wall thereof and wherein said slot extends inwardly into said opening.

6. A valve reseating tool, according to claim 5, wherein said rotary member has an annularly-grooved portion near the rearward end thereof rotatably engageable with said thrust bearing and relatively slidably and detachably engageable with said slot in said hand grip element.

References Cited in the file of this patent

UNITED STATES PATENTS

| | | |
|---|---|---|
| 1,469,945 | Morsdoff | Oct. 9, 1923 |
| 1,911,847 | Reilly | May 30, 1933 |
| 1,936,727 | Matthews | Nov. 28, 1933 |
| 1,999,815 | Lake | Apr. 30, 1935 |
| 2,230,983 | Wommer | Feb. 4, 1941 |
| 2,677,309 | Koons | May 4, 1954 |

FOREIGN PATENTS

| | | |
|---|---|---|
| 1,023,086 | France | Dec. 24, 1952 |